(12) United States Patent
Vander Neut et al.

(10) Patent No.: US 11,842,553 B2
(45) Date of Patent: Dec. 12, 2023

(54) WEAR DETECTION IN MECHANICAL EQUIPMENT

(71) Applicant: ExxonMobil Technology and Engineering Company, Annandale, NJ (US)

(72) Inventors: Christopher J. Vander Neut, Spring, TX (US); Matthew L. Dinslage, Magnolia, TX (US); Thomas A. Schiff, Spring, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 264 days.

(21) Appl. No.: 17/287,821

(22) PCT Filed: Nov. 15, 2019

(86) PCT No.: PCT/US2019/061779
§ 371 (c)(1),
(2) Date: Apr. 22, 2021

(87) PCT Pub. No.: WO2020/117453
PCT Pub. Date: Jun. 11, 2020

(65) Prior Publication Data
US 2021/0383160 A1 Dec. 9, 2021

Related U.S. Application Data

(60) Provisional application No. 62/776,069, filed on Dec. 6, 2018.

(51) Int. Cl.
*G06V 20/64* (2022.01)
*G06V 10/764* (2022.01)

(52) U.S. Cl.
CPC ............ *G06V 20/64* (2022.01); *G06V 10/764* (2022.01); *G06V 2201/06* (2022.01)

(58) Field of Classification Search
CPC ... G06V 20/64; G06V 2201/00; G06V 10/764
See application file for complete search history.

(56) References Cited

U.S. PATENT DOCUMENTS

| 6,600,553 B1 | 7/2003 | Stone |
| 9,754,146 B2 | 9/2017 | Izaki et al. |
| (Continued) | | |

FOREIGN PATENT DOCUMENTS

| CN | 104484675 A | * 4/2015 | ........... G06K 9/6259 |

OTHER PUBLICATIONS

Z. Peng et al.; "The Development of an Expert System for Wear Debris Analysis"; DSTO International Conference on Health and Usage Monitoring, Melbourne, Feb. 19-20, 2001.*

(Continued)

*Primary Examiner* — Shaghayegh Azima
(74) *Attorney, Agent, or Firm* — Vorys, Sater, Seymour and Pease LLP (57) ABSTRACT

Aspects of the technology described herein describe a system for detecting and reducing wear in industrial equipment. Aspects of the technology use 3D image data from a field inspection of industrial equipment to identify and quantify wear. The wear can be detected by providing the images from the field inspection to a computer classifier for recognition. Aspects of the technology also use machine learning to recommend a change to the operation of the equipment to minimize wear. Such a change could include load shedding, lube oil feed rate changes, prompts for maintenance, etc. Through incorporation of the wear data into the control (Continued)

system, the equipment can automatically change operation to improve wear performance and increase the durability and lifetime of the equipment.

7 Claims, 7 Drawing Sheets

(56) References Cited

U.S. PATENT DOCUMENTS

| | | | | |
|---|---|---|---|---|
| 9,911,033 | B1* | 3/2018 | Harary | G06V 30/19173 |
| 2002/0141026 | A1 | 10/2002 | Wiklof et al. | |
| 2016/0275628 | A1* | 9/2016 | Mishra | G06Q 50/04 |
| 2017/0140187 | A1 | 5/2017 | Izaki et al. | |
| 2019/0339165 | A1* | 11/2019 | Finn | G06T 7/0008 |
| 2020/0026257 | A1* | 1/2020 | Dalal | G05B 19/4063 |

OTHER PUBLICATIONS

Z. Peng et al.; "Wear-debris analysis in expert systems"; Tribology letters (Year: 2001).*

Yunus Santur et al.; "A New Rail Inspection Method Based on Deep Learning Using Laser Cameras"; IEEE (Year: 2017).*

Marilyn, "Gear and Reducer Inspection and Analysis", EfficientPlantmag.com, Mar. 1, 2008, pp. 1-7.

Peng, et al., "The Development of an Expert System for Wear Debris Analysis", DSTO International Health and Usage Monitoring, Feb. 19-20, 2001, Mar. 12, 2001 (Mar. 12, 2001), pp. 5-12, XP055671537.

Peng, et al., "Wear-Debris Analysis in Expert Systems", Tribology Letters, Nov. 1, 2001 (Nov. 1, 2001), pp. 177-184, XP055671524, New York.

Santur et al., "A New Rail Inspection Method Based on Deep Learning Using Laser Cameras", Sep. 16, 2017 (Sep. 16, 2017), 2017 International Artificial Intelligence and Data Processing Symposium (IDAP), IEEE, pp. 1-6, XP033244159.

Reduan, "Multi-view and three-dimensional (3D) images in Wear Debris Analysis (WDA)", A thesis submitted to the University of Manchester for the degree of Doctor of Philosophy in the Faculty of Engineering and Physical Sciences, Jun. 18, 2013 (Jun. 18, 2013), XP055671434.

Errichello, "How to Analyze Gear Failures", Practical Failure Analysis, vol. 2, No. 6, Dec. 1, 2002 (Dec. 1, 2002), pp. 8-16, XP055671470, New York.

International Search Report and Written Opinion of the International Searching Authority dated Mar. 9, 2020.

* cited by examiner

WEAR DETECTION IN MECHANICAL EQUIPMENT

CROSS-REFERENCE TO RELATED APPLICATIONS

This application is a National Stage Application of International Application No. PCT/US2019/061779, filed Nov. 15, 2019 and claims the benefit of and priority to U.S. Provisional Application No. 62/776,069 filed on Dec. 6, 2018. The entire disclosure of the above application is fully incorporated herein by reference.

FIELD

Using three-dimensional scanning to detect wear in mechanical equipment.

BACKGROUND

Present commercial practice for equipment inspection includes vibration analysis, clearance measurements, temperature measurements, alignment check, and even carbon paper to represent wear patterns. Additionally, an analysis of lubrications removed from the equipment can indicate problems with the equipment.

U.S. Pat. No. 9,754,146 describes a portable optical scanner that captures images that can be used to generate a 3D model of a surface.

SUMMARY

Aspects of the technology described herein describe a system for detecting and reducing wear in industrial equipment. Aspects of the technology use 3D image data from a field inspection of industrial equipment to identify and quantify wear. The wear can be detected by providing the images from the field inspection to a computer classifier for recognition. The machine classifier can be trained to detect various visual patterns consistent with different types of abnormal wear, such as pitting, spalling, abrasive wear, corrosive wear, thermal stress, machine marks, honing marks, and others.

Aspects of the technology use machine learning to recommend a change to the operation of the equipment to minimize wear. Such a change could include load shedding, lube oil feed rate changes, prompts for maintenance, etc.

The field engineer conducting the inspection utilizes a device with one or two scanners built in. The scanners can be attached to a mounting device that attaches to the equipment via suction, magnet, or other non-permanent and non-destructive means. Once set up, the scanner is oriented to the piece of equipment, such as a gear tooth, bearings, engine cylinders, or machine ways, and the engineer can slide the scanner over the surface to collect the measurement. The data from the scanner is loaded into a computer where it is processed and overlaid to generate a 3D rendering of the gear, bearing, cylinder, or other equipment surface. Through incorporation of the wear data into the control system, the equipment can automatically change operation to improve wear performance and increase the durability and lifetime of the equipment.

DETAILED DESCRIPTION

Overview

Aspects of the technology described herein describe a system for detecting and reducing wear in industrial equipment. Aspects of the technology use 3D image data from a field inspection of industrial equipment to identify and quantify wear imperfections. The wear can be detected by providing the images from the field inspection to a computer classifier for recognition. The machine classifier can be trained to detect various visual patterns consistent with different types of abnormal wear, such as pitting, spalling, abrasive wear, corrosive wear, thermal stress, machine marks, honing marks, and others. The type of wear can also include normal wear. In one aspect, a convolutional neural network is used to classify wear patterns depicted on images captured during the field inspection. Other image analysis technologies may also be used.

Aspects of the technology may use machine learning to recommend a change to the operation of the equipment to minimize wear. Such a change could include load shedding, lube oil feed rate changes, prompts for maintenance, etc. Use of different machine learning processes are possible in different aspects, including supervised learning processes (e.g., decision tree, random forest, logistic regression), unsupervised learning (e.g., apriori algorithm, K-means), or reinforcement learning. In each case, information about the equipment is used as an input to determine the change to recommend. For example, the result of the image analysis can be input, along with equipment operational records, monitoring records (e.g., vibrations, force), fluid analysis, and other information to machine learning process. The machine learning process then outputs one or more change recommendations.

The field engineer conducting the inspection utilizes a device with one, two, or more scanners built in. The scanners can be attached to a mounting device that attaches to the equipment via suction, magnet, or other non-permanent and non-destructive means such as adhesive. In one example, the devise is mounted to the metal protective covering housing a gear and the scanner body may be inserted through an observation hatch without removing the covering. Once set up, the scanner is oriented to the piece of equipment, such as gear tooth, and the engineer can slide or move the scanner over the surface to collect the measurement. The data from the scanner is loaded into a computer where it is processed and overlaid to generate a 3D rendering of the gear or other equipment surface. The user can also use the software to view actual data and measurements from the gear tooth. A similar process may be used for other pieces of equipment such as bearings, engine cylinders, machine ways, or other machine surfaces. As the tool is used on the same location on the same equipment over time, a database is built up whereby comparison of successive scanned images can be made both visually and numerically. This sequence of images can be used to generate a trend analysis that can be used to estimate the useful life of the equipment. The analysis may quantify new or growing wear locations, or improvements in gear condition. This database can then be used to influence or even control lubrication and maintenance practices, or even the mechanical operation of the equipment. Through incorporation of the data into the control system, the equipment can automatically change operation to improve wear performance and increase the durability and lifetime of the equipment.

Figure 1:
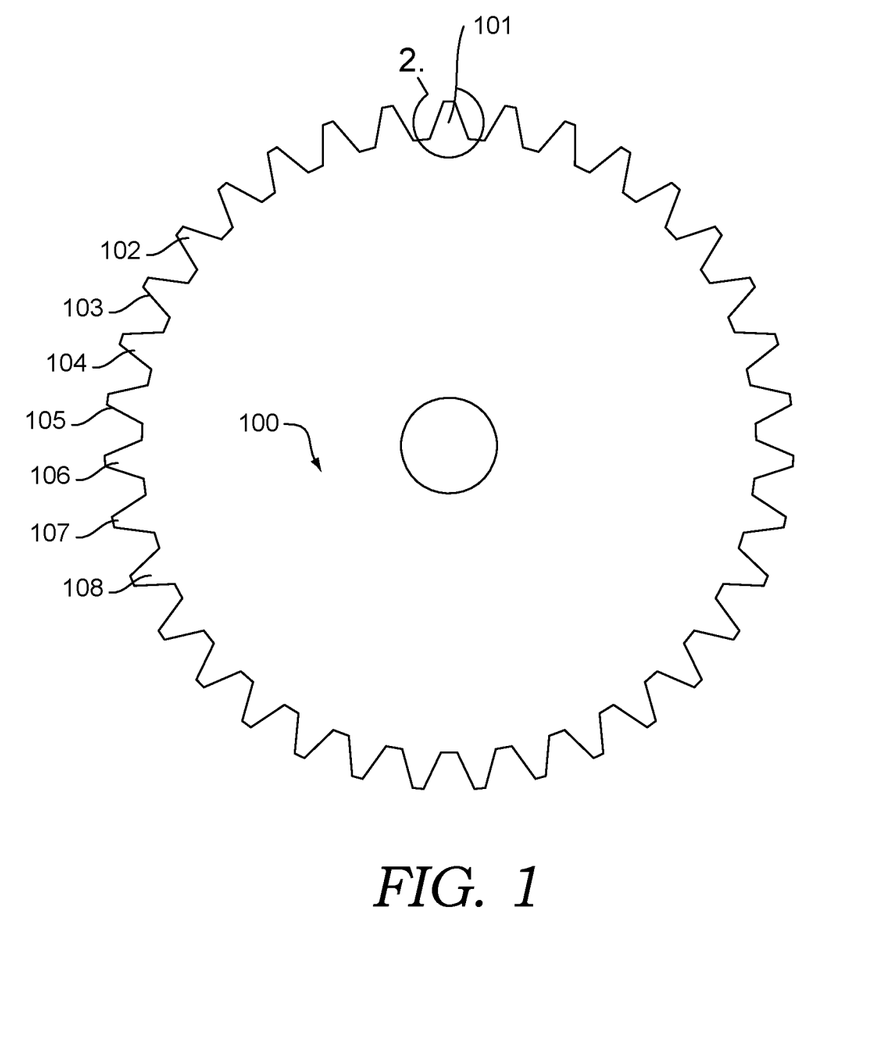
FIG. 1 is a diagram showing a gear that can be evaluated for wear, according to an aspect of the technology described herein.

Turning now to FIG. 1, a drawing of a gear is provided. The gear is one type of equipment that can be evaluated for wear using the technology described herein. The technology described herein can also be used to inspect bearings, engine cylinders, machine ways and other equipment. Gears can be found in lots of different equipment. Aspects of the technology are not limited to use with a gear or just to equipment that includes gears. The term equipment can be used to describe any part of a machine or an entire machine. As can be seen, the gear includes several teeth. The teeth include tooth 101, tooth 102, tooth 103, tooth 104, tooth 105, tooth 106, tooth 107, tooth 108, and several other teeth not individually numbered for the sake of simplicity. In practice, the actual number of teeth may vary.

Figure 2:
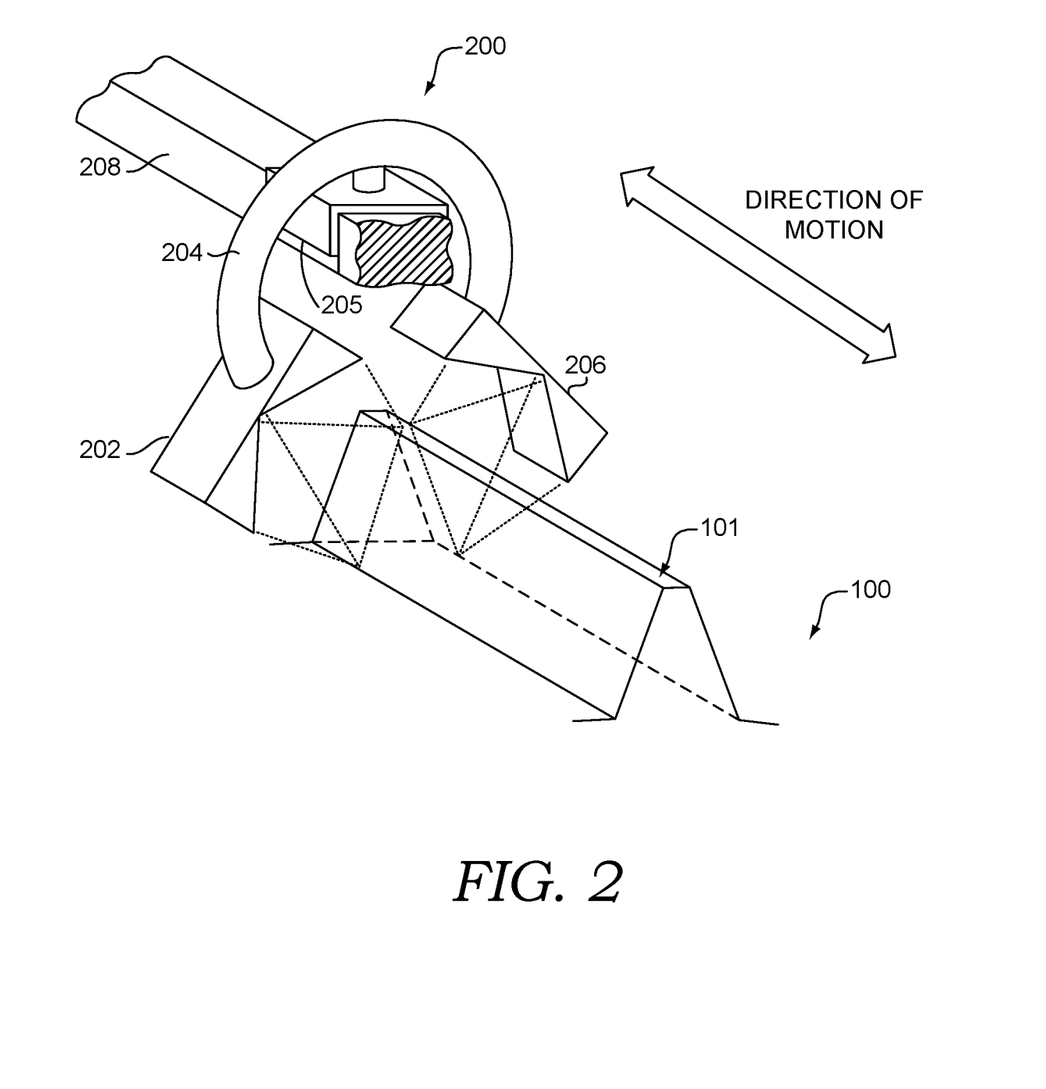
FIG. 2 is a diagram showing a digital scanning rig on a gear tooth, according to an aspect of the technology described herein.

Turning now to FIG. 2, a closer look at tooth 101 and a scanning rig 200 is provided, according to an aspect of the technology described herein. The scanning rig 200 may be removably attached to the gear 100 or the gear tooth 101. In this embodiment, the scanning rig 200 includes a left scanner 202 and a right scanner 206 attached by a handle 204 that slides along a guide rail 208. The guide rail 208 is attached to legs (not shown) that attach the rail to the gear 100. The legs may have magnets, suction cups, adhesives, or some other method to secure the rig 200 to the gear 100. As the scanners 202 and 206 slide along the faces of the tooth 101, three-dimensional images are captured. These images may be communicated to the wear detection engine 360, described subsequently. Generating usable 3D images may require processing of the data captured by the scanners. The processing implemented will depend on the type of scanner used. The processing is described herein as "by the camera," but this could include by any computing system the image data is provided to by the camera. Either way, the end result is a 3D image that is used to detect wear in the equipment. As used herein, a 3D image comprises pixels having both color and depth data. The 3D image may be described as a point cloud. The 3D image does not need to be rendered for output on a 2D display.

The 3D scanners 202 and 206 can utilize one or more different technologies, including structured light and time-of-flight technology, to generate 3D images. 3D images can assign a depth to each pixel captured. The pixels can have also have red, green, and blue (RGB) color values. A structured light sensor comprises a light emitter and a camera. The light emitter illuminates a scene with structured light. The camera captures the structured light as it is reflected off the scene. Structured light cameras store a reference image. The reference image is what the projected light pattern would look like on a flat object at a known distance. The range to an object, such as the face of a gear tooth, is calculated by comparing the reference image to the actual image of the scene.

A structured light image is the reflection of a structured light pattern off objects in the scene. The depth map can be determined by capturing the structured light image and then using a triangulation method to determine a depth profile (i.e., depth map) based on the observed relative translation of known features of the structured illumination in the captured structured light image as scaled by the estimated baseline from the illuminator (light emitter) to the sensor.

In this discussion, a 3D image generated from structured light corresponds to an image derived in part from use of a structured light source. A structured light source corresponds to a light source or illumination source that projects a plurality of units (e.g., dots) arranged to form a pattern or structure. In some aspects, the light source for projecting a structured light image can be an infrared light source and/or another light source with reduced or minimized detectability in the visible spectrum. This can allow the structured light image to be projected onto an environment while having a reduced or minimized impact on images obtained using conventional visible light cameras (and/or other visible light detectors). The structured light image can then be captured using a corresponding camera (and/or other detector) suitable for detection of the type of light projected by the structured light source.

The units of the structured light image can correspond to any convenient type of reference pattern, so long as the reference pattern at any point in time is known for purpose of generating a depth map, which depicts the location of the equipment. A depth map can be determined based on a structured light image by, for example, triangulation. One option for triangulation can be to have a known distance relationship between the structured light source and a single camera for capturing the structured light image. In this type of option, the known offset between the structured light source and the camera can be used in combination with a predetermined reference image projected by the structured light source to allow the light source to be used as a "virtual camera" for purposes of triangulation.

The scanners may be time-of-flight cameras. The time-of-flight camera may be a phase modulation time-of-flight camera. It comprises a light emitter and an image sensor. The light emitter outputs modulated light. In an example, the source of modulated light may be an incoherent light source, which emits transmitted light that is modulated with a signal at a modulation frequency. In an example, the light from the device may be modulated rapidly, such that the amount of illumination changes periodically.

In a phase modulation system, the light emitter can output light at multiple modulation frequencies. The light emitter may be selected so that the wavelength of the emitted light is the most appropriate wavelength for a particular application. In an aspect, the light source may be selected to be a source of light of an appropriate wavelength for the application for which it is intended.

The light source may illuminate an object within the field of the camera and at least some of the light is reflected back toward the camera from the object. The reflected light may be detected by the image sensor. The reflected light is also modulated and the reflected light may be out of phase with the transmitted light due to the delay caused by the distance the light has travelled on the return trip between the sensor and the object. For each pixel of the image sensor, the amplitude and phase difference of the received signal relative to the transmitted light may be determined for each modulation frequency and used to calculate a depth for the pixel.

Figure 3:
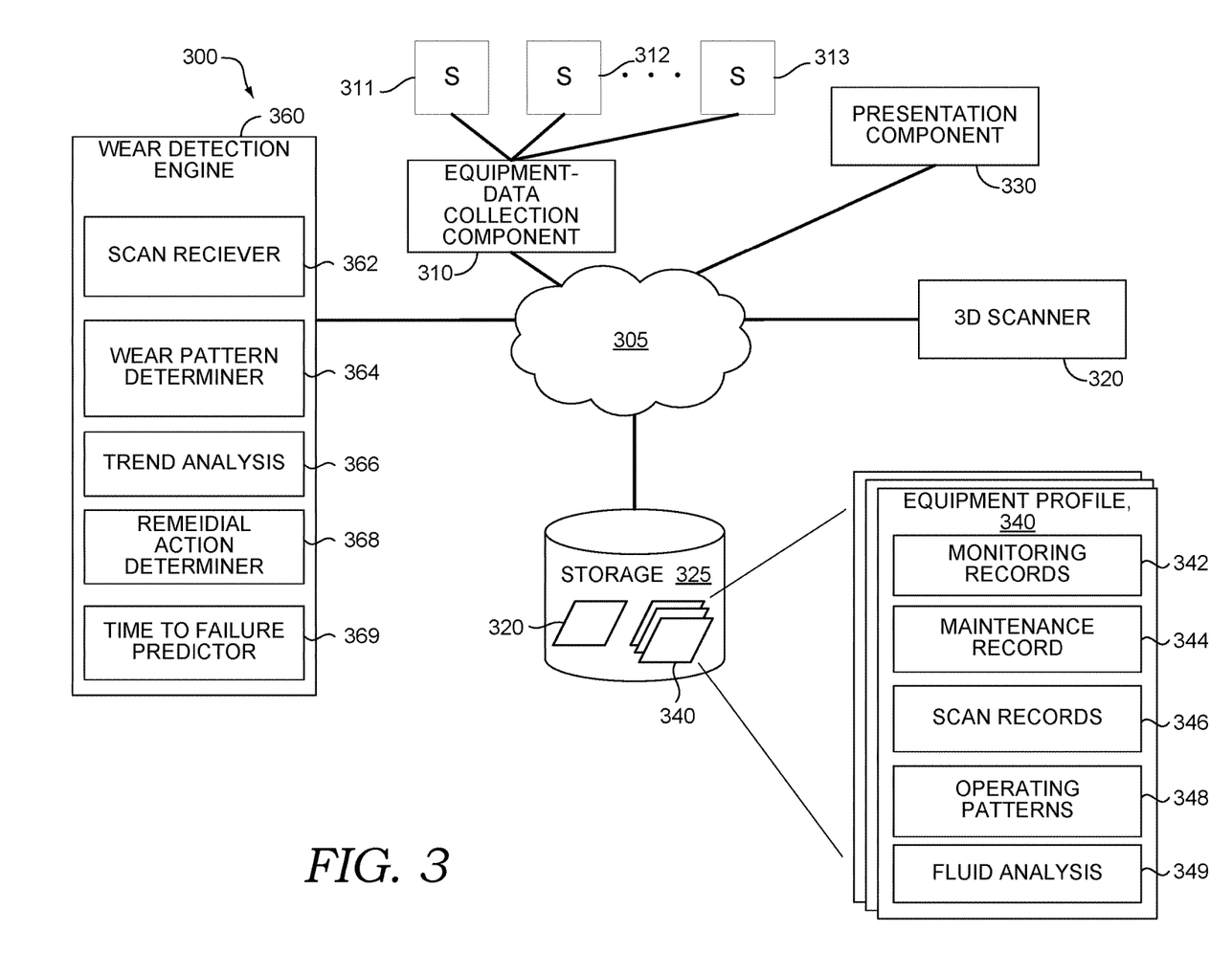
FIG. 3 is a diagram showing an operating environment for a wear detection system, according to an aspect of the technology described herein.

Turning now to FIG. 3, a block diagram is provided illustrating a wear detection system 300 in which some embodiments of the present disclosure may be employed. The wear detection system 300 receives 3D image data from the scanning rig 200 (or some other scanning system). The images are analyzed to detect wear and recommend changes to extend the life of the equipment by reducing wear or improving oil feed rate. The components of wear detection system 300 may be embodied as a set of compiled computer instructions or functions, program modules, computer software services, or an arrangement of processes carried out on one or more computer systems, such as computing device 700 described in connection to FIG. 7, for example.

In one embodiment, the functions performed by components of wear detection system 300 are associated with one or more applications, services, or routines. In particular, such applications, services, or routines may operate on one or more user devices (e.g., personal computers, tablets, desktops, laptops) and servers, may be distributed across one or more user devices and servers, or be implemented in the cloud. Moreover, in some embodiments, these components of wear detection system 300 may be distributed across a network 310, including one or more servers and client devices, in the cloud, or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the disclosure described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regard to specific components shown in example wear detection system 300, it is contemplated that in some embodiments, functionality of these components can be shared or distributed across other components.

As noted above, it should be understood that the wear detection system 300 shown in FIG. 3 is an example of one system in which embodiments of the present disclosure may be employed. Each component shown may include one or more computing devices. The wear detection system 300 should not be interpreted as having any dependency or requirement related to any single module/component or combination of modules/components illustrated therein. Each may comprise a single device or multiple devices cooperating in a distributed environment. For instance, the wear detection system 300 may comprise multiple devices arranged in a distributed environment that collectively provide the functionality described herein. Additionally, other components not shown may also be included within the network environment. It should be understood that the wear detection system 300 and/or its various components may be located anywhere in accordance with various embodiments of the present disclosure.

The wear detection system 300 generally operates to detect wear and wear trends in industrial equipment using image analysis. The wear detection system 300 may also recommend changes to reduce wear. As briefly mentioned above, each component of the wear detection system 300, including wear detection engine 360, equipment-data collection component 310, 3D scanner 320, presentation component 330, storage 325, and their respective subcomponents, may reside on a computing device (or devices). For example, the components of the wear detection system 300 may reside on the exemplary computing device 700 described below and shown in FIG. 7, or similar devices. Accordingly, each component of the wear detection system 300 may be implemented using one or more of a memory, a processor or processors, presentation components, input/output (I/O) ports and/or components, radio(s), and a power supply (e.g., as represented by reference numerals 712-724, respectively, in FIG. 7).

At a very high level, the wear detection system 300 includes input components, analysis components, and output components. The equipment data collection component 310 and the 3D scanner 320 are the primary input components. Data collected by these components can be stored in storage 325 for subsequent analysis. The wear detection engine 360 analyzes the equipment data, including 3D images, to identify types of wear patterns, trends in these patterns over time, and recommendations to change equipment operation to reduce wear. Each of these pieces of equipment will be described in detail subsequently, starting with the components that collect data to be analyzed.

The 3D scanner 320 provides 3D data and images of equipment to be analyzed. The 3D scanner 320 can be similar to the scanning rig 200 described previously. The 3D scanner 320 can include one or more scanners that generate images of a piece of equipment or a portion of the equipment. Different types of 3D scanners can be used. As described previously, time-of-flight and structured light scanners can be used to generate 3D images of equipment. The 3D images are provided to the scan receiver 362. In addition to the images, metadata describing the equipment or portion of the equipment to be analyzed may be provided with the images. For example, a series of images of a single tooth or portion of a piece of equipment could be provided with annotations that label the portion of the equipment and the overall equipment that the portion is part of. The date and/or time the images were taken can also be provided. The metadata can include gyroscopic data, accelerometer, or other orientation or location data to help analyze the images. The orientation location data can be used to stitch together a 3D model of the equipment using a combination of images.

In addition to the image data, equipment operational data can be used, for example, by the remedial action determiner 368 to generate a recommendation for an operational change. The equipment-data collection component 310 collects operational data from one or more sensors (311, 312, and 313) that monitor the operations of the equipment being evaluated. The sensors 311, 312, and 313 could measure vibration, temperature, radiation, proximity, pressure, strain, position, motion, metal, level, leak, humidity, gas, force, flow, or other characteristics of the equipment. Temperature sensors may be electronic devices that detect thermal parameters and provide signals to controllers, alarms, or other systems. Warmer than normal temperature can be a sign of increased friction that can lead to excessive wear. Proximity sensors are electronic devices that detect the presence of nearby objects through non-contacting means. A proximity sensor can detect the presence of objects usually within a range of up to several millimeters. Proximity sensors can check the alignment of various components. Pressure sensors are electro-mechanical devices that detect forces per unit area in gases or liquids. Changes of pressure within a lubrication system can indicate a problem with the system. Position sensors detect the state of various components, such as valves, to determine whether the component is open, closed, or in between. Motion sensors can determine how fast a part is moving. For example, a motion sensor could determine the revolutions per minute of a wheel, gear, bearings, engine cylinders, machine ways, or other piece of equipment. Level sensors can detect the fluid or gas level in a vessel. For example, a level sensor could detect the level of lubricant in a storage vessel. Many pieces of equipment have lubrication systems and maintaining an appropriate amount of lubricant in the system can be an important factor in reducing wear. The leak sensor is used to identify the unwanted discharge of liquids or gases. A humidity sensor detects the amount of water in the air. Force sensors are electronic devices that measure various parameters related to forces such as weight, torque, load, etc. and provide signals to the inputs of control or display devices. A force sensor typically relies on a load cell, which is a piezoelectric device whose resistance changes under deforming loads. Other methods exist for measuring torque and strain.

Equipment data can also include fluid analysis records, such as analysis results of lubricants, coolants, and/or other fluids removed from equipment. The fluid may be removed for the express purpose of analysis or as part of routine maintenance. For example, the oil removed from equipment during an oil change can be tested upon removal. Alternatively, only a small oil sample could be removed. Representative fluid parameters analyzed can include lead content, water content, iron content, aluminum content, sodium content, copper content, silicon content, chromium content, titanium content, tin content, zinc content, nickel content, potassium, calcium, phosphorus, sulfur, and vanadium content. The oil can also be analyzed for oxidation, viscosity, soot content, water content, and the oil's ability to neutralize acids. The analysis results can be stored in a fluid analysis store 249 within the equipment profile 240.

The signals can also be from maintenance records, including analysis/replacement/repair of parts (e.g., belts, bearings). The maintenance data can be stored as maintenance events. Each maintenance event can be associated with a date, duration (i.e., total downtime), expense, and explanation of maintenance performed, including a record of measured equipment parameters at the time of the event (such as time in service reading). The maintenance events can be stored in maintenance record store 244 of the equipment profile 240.

In some respects, equipment data may be provided in data streams or signals. A fluid property sensor, such as an oil monitor, can measure the fluid (e.g., oil) viscosity and other characteristics (e.g., acid level, soot level, coolant/water concentration, etc.). An "equipment signal" can be a feed or stream of sensor data from any sensor associated with the equipment. The collection component 210 receives or accesses data continuously, periodically, or as needed.

The equipment data and event data derived from it can be stored in storage 225. The storage 225 can include multi-equipment records 230 and individual equipment profiles 340. The multi-equipment records 230 can include use patterns, maintenance patterns, operational-soundness patterns, and other data derived from multiple pieces of equipment. Each equipment profile 340 collects information about a single piece of equipment.

The equipment data and conclusions from analysis of data from a single piece of equipment may be stored in equipment profile 240. The equipment profile 240 allows information from equipment to be viewed, analyzed, edited, or otherwise accessed. For example, the presentation component 330 can generate overlays of 3D models generated at different times. In one aspect, the overlay shows changes to the equipment that occurred over time. The equipment profile 240 can include monitoring records 242, maintenance record store 244, scan data store 246, operating patterns store 248, and fluid analysis store 249.

The input data is either fed directly into the wear detection engine 360 or treated by the wear detection engine from storage 325. The wear detection engine 360 includes scan receiver 362, wear pattern determiner 364, trend analysis component 366, remedial action determiner 368, and time to failure predictor 369.

The scan receiver 362 receives image data from the 3D scanner 320 and other sources, such as the scan records 346 in equipment profile 340. The scan receiver 362 may preprocess various images for consumption by various components in the wear detection engine 360. For example, the images may be edited to a uniform dimension.

The wear pattern determiner 364 uses computerized image analysis to identify a type of wear pattern. In one aspect, a neural network can be used to identify different wear patterns. The wear patterns can include pitting, spalling, abrasive wear, corrosive wear, thermal stress, machine marks, honing marks, normal wear, and others. The wear pattern could also indicate normal wear. Equipment naturally wears through its useful life. The wear pattern determiner 364 can be trained to detect normal wear.

In one aspect, the wear pattern determiner 364 is a neural network. As used herein, a neural network comprises at least three operational layers. The three layers can include an input layer, a hidden layer, and an output layer. Each layer comprises neurons. The input layer neurons receive the images of the equipment and pass data derived from the pictures to neurons in the hidden layer. Neurons in the hidden layer pass data to neurons in the output layer. The output layer then produces a wear pattern classification. Different types of layers and networks connect neurons in different ways.

Neurons have weights, an activation function that defines the output of the neuron given an input (including the weights), and an output. The weights are the adjustable parameters that cause a network to produce a correct output. For example, if the training image showed pitting, then the correct output is to classify the image as showing pitting. The weights are adjusted during training. Once trained, the weight associated with a given neuron can remain fixed. The other data passing between neurons can change in response to a given input (e.g., image). Retraining the network with an additional training image can update one or more weights in one or more neurons.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The training implementation described subsequently uses a convolutional neural network, but aspects of the technology are applicable to other types of machine learning.

In each type of deep model, training is used to fit the model output to the training data. In particular, weights associated with each neuron in the model can be updated through training. Originally, the model can comprise random weight values that are adjusted during training. In one aspect, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. The analogous training data comprises labeled analogous images. Each labeled image is input to the model and used to train it. Once a sufficient number of training images are fed to the wear pattern determiner 364, then the training can stop. The wear pattern determiner 364 can then be used to classify unlabeled images.

In one aspect, wear pattern determiner 364 comprises a single model that can identify multiple different wear patterns. In another aspect, wear pattern determiner 364 comprises multiple models with each model able to detect a single wear pattern. In the multiple model implementation, the images are passed to each model and the model outputs a yes/no result for the particular pattern the model is trained to detect. The end result of wear pattern determiner 364 is the identification of one or more wear patterns from the images. In one aspect, the wear pattern determiner 364 can work with the presentation component 330 to annotate the rendered images or the portion of the image that includes the wear pattern. For example, the portion of the image showing the wear pattern could be boxed, circled, lassoed, or otherwise indicated. Multiple wear patterns could be identified in a single image.

In an aspect, wear patterns can both be detected and quantified. For example, hitting could be classified on a scale from 1 to 10 with 10 being the most serious. The wear pattern determiner 364 can be trained to quantify the seriousness of an identified wear pattern by providing images of the wear patterns annotated with a seriousness score.

The trend analysis component 366 identifies changes in equipment conditions over time. In aspects, the same piece of equipment may be analyzed by the technology described herein on a regular basis, such as weekly, monthly, yearly, and so forth. The trend analysis component 366 can detect changes between the results of different inspections. In one aspect, a material change for an inspected piece of equipment is generated. The material change can be a change in volume as the base material of the equipment wears away. For example, deeper pitting could be indicated. Material change could also be the change in the surface area of an area affected by a particular type of wear pattern, such as pitting. Material changes can be visually depicted for a user through presentation component 330.

The remedial action determiner 368 generates a recommendation to change operational parameters of the equipment being evaluated. Various wear patterns can be correlated to suggested changes in equipment operation. For example, certain wear patterns may indicate that the lubrication needs to be changed, flow rates within the lubrication system should be increased, and so forth. The remedial action determiner 368 can use the output from the wear pattern determiner 364 as an input. In addition, the remedial action determiner 368 can look at all the equipment data captured by equipment data collection component 310. In particular, the remedial action determiner 368 can look for correlations between equipment operation parameters and wear patterns identified by wear pattern determiner 364. For example, a correlation could be identified between equipment loads and wear patterns. If this correlation was made, the recommendation could be to change the equipment loads to limit wear. Different types of machine learning can be used to find correlations. In one aspect, an association rule engine is used to find correlations.

The time to failure predictor 369 can provide an overall health score for a piece of equipment or a portion of the equipment. The time to failure predictor 369 can use the output of other components, but can also do its own image analysis. In one aspect, the time to failure predictor 369 is trained using images that are annotated according to a useful life or other health score. For example, the time to failure predictor 369 could be a convolutional neural network trained using 1,000 images of gear teeth that are labeled as new, 1,000 images of gear teeth labeled as slightly used, 1,000 images of gear teeth labeled midlife, and so on down to completely worn out gear teeth. These numbers are just examples and not meant to be limiting. The new images captured by the field technician can then be analyzed for similarity to the labeled images in order to generate a useful life measurement or score. Other data such as maintenance records, usage records, wear type classifications for the equipment, and components generated by the wear pattern determiner 346 or the trend analysis component 366 can be used to generate an estimate of the useful life of the equipment.

Figure 4:
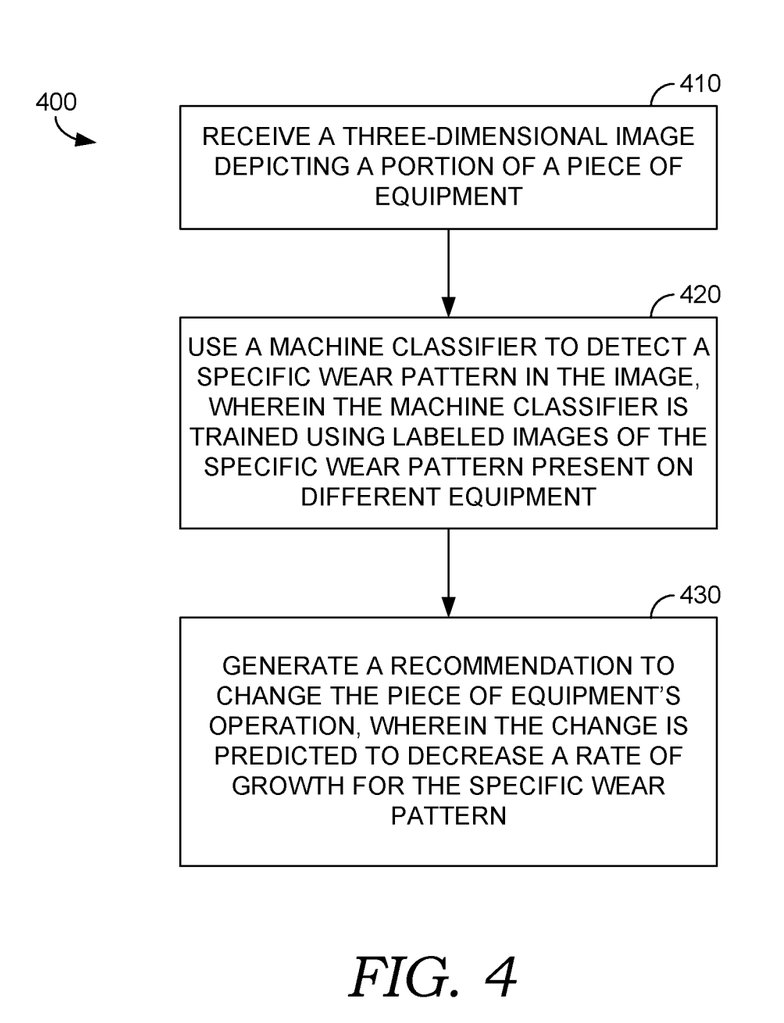
FIG. 4 is a flow chart showing a method of detecting equipment wear, according to an aspect of the technology described herein.

Turning now to FIG. 4, a flow chart showing a method 400 for detecting equipment wear is provided, according to an aspect of the technology described here. Method 400 could be performed by system 300 described previously.

At step 410, a three-dimensional image depicting a portion of a piece of equipment is received. The three-dimensional image can be generated by a 3D scanner, such as the one described previously with reference to FIG. 2. For example, a time-of-flight scanner or structured light scanner could be used to generate the three-dimensional image. In some aspects, a plurality of images depicting the portion of the piece of equipment are provided. As used herein, a three-dimensional image comprises pixels having both color and depth data.

At step 420, a machine classifier is used to detect a specific wear pattern in the image. The image does not need to be rendered before processing by the machine classifier. The machine classifier may use the raw depth data and color data as input. In one aspect, preprocessing is performed to identify geometry, such as shapes, surfaces, and edges, in the image. In this case, the geometry can be analyzed by the machine classifier in isolation or with other image data. The machine classifier is trained using labeled images of the specific wear pattern, as described previously with reference to FIG. 3. In one aspect, a neural network can be used to identify different wear patterns. The wear patterns can include pitting, spalling, abrasive wear, corrosive wear, thermal stress, machine marks, honing marks, normal wear, and others. The wear pattern could also indicate normal wear.

As used herein, a neural network comprises at least three operational layers. The three layers can include an input layer, a hidden layer, and an output layer. Each layer comprises neurons. The input layer neurons receive the images of the equipment and pass data derived from the pictures to neurons in the hidden layer. Neurons in the hidden layer pass data to neurons in the output layer. The output layer then produces a wear pattern classification. Different types of layers and networks connect neurons in different ways.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The training implementation described subsequently uses a convolutional neural network, but aspects of the technology are applicable to other types of machine learning.

In each type of deep model, training is used to fit the model output to the training data. In particular, weights associated with each neuron in the model can be updated through training. Originally, the model can comprise random weight values that are adjusted during training. In one aspect, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. The analogous training data comprises labeled analogous images. Each labeled image is input to the model and used to train it. Once a sufficient number of training images are fed to the wear pattern determiner 364, then the training can stop. The wear pattern determiner 364 can then be used to classify unlabeled images.

At step 430, a recommendation to change the piece of equipment's operation is generated. The change is predicted to decrease a rate of growth for the specific wear pattern. Various wear patterns can be correlated to suggested changes in equipment operation. For example, certain wear patterns may indicate that the lubrication needs to be changed, flow rates within the lubrication system should be increased, and so forth. Aspects of the technology can use the output details about the wear pattern. In addition, the technology can look at all the equipment data to help identify causes of different wear patterns. The change can be to correct an operational problem that seems to cause the wear pattern. In particular, the technology can look for correlations between equipment operation parameters and wear patterns. For example, a correlation could be identified between equipment loads and wear patterns. If this correlation was made, the recommendation could be to change the equipment loads to limit wear. Different types of machine learning can be used to find correlations.

In one aspect, an association rule engine is used to find correlations. Association rule learning is a rule-based machine learning method for discovering interesting relations between variables in large databases. This rule-based approach also generates new rules as it analyzes more data. The ultimate goal, assuming a large enough dataset, is to help a machine mimic the human brain's feature extraction and abstract association capabilities from new uncategorized data.

Figure 5:
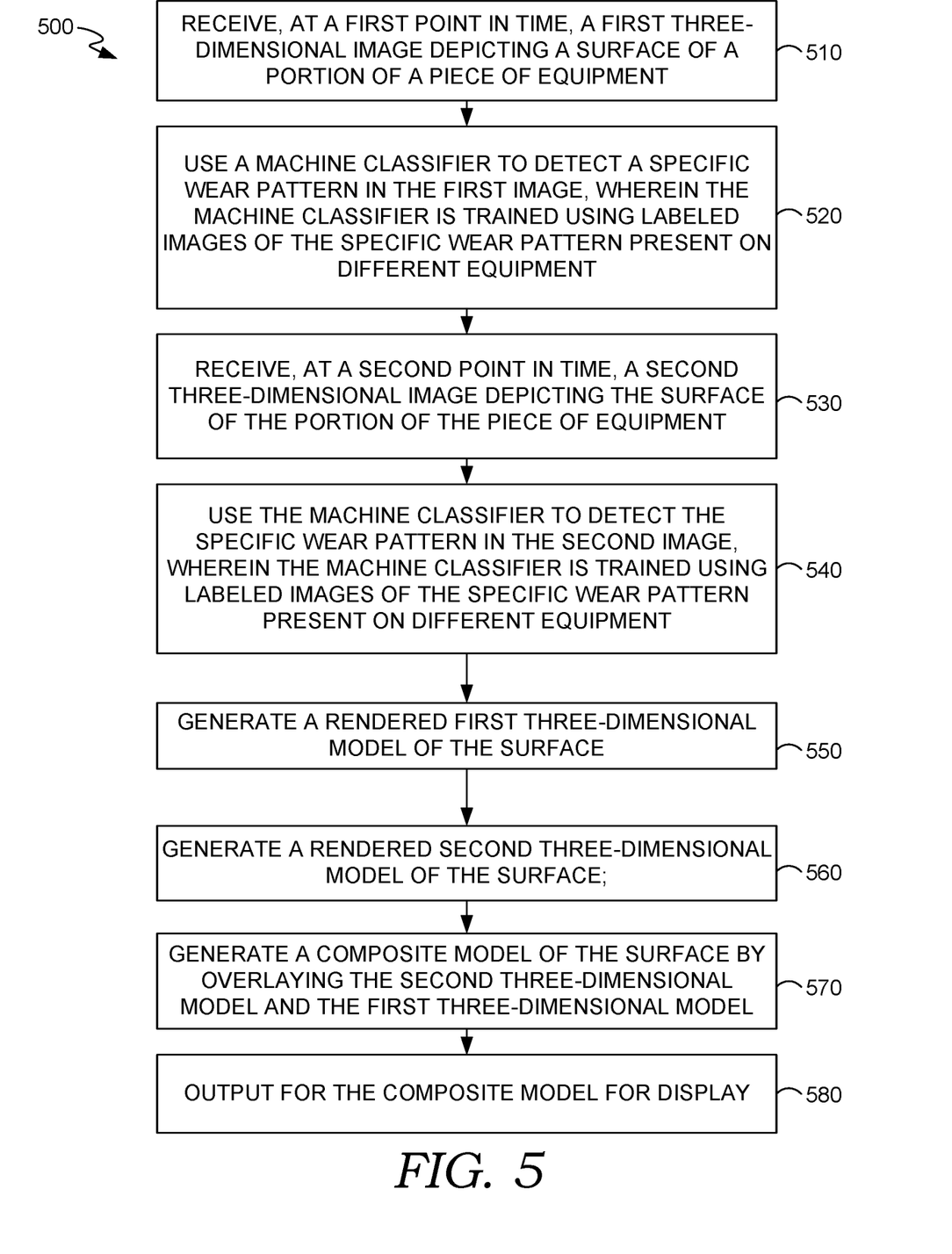
FIG. 5 is a flow chart showing a method of detecting equipment wear trends, according to an aspect of the technology described herein.

Turning now to FIG. 5, a flow chart showing a method 500 for detecting an equipment wear trend is provided, according to an aspect of the technology described here. Method 500 could be performed by system 300 described previously.

At step 510, a first three-dimensional image depicting a surface of a portion of a piece of equipment is received at a first point in time. The three-dimensional image can be generated by a 3D scanner, such as the one described previously with reference to FIG. 2. For example, a time-of-flight scanner or structured light scanner could be used to generate the three-dimensional image. In some aspects, a plurality of images depicting the portion of the piece of equipment are provided. As used herein, a three-dimensional image comprises pixels having both color and depth data.

At step 520, a machine classifier is used to detect a specific wear pattern in the first image. The image does not need to be rendered before processing by the machine classifier. The machine classifier may use the raw depth data and color data as input. In one aspect, preprocessing is performed to identify geometry, such as shapes, surfaces, and edges, in the image. In this case, the geometry can be analyzed by the machine classifier in isolation or with other image data. The machine classifier is trained using labeled images of the specific wear pattern present on different equipment. In one aspect, a neural network can be used to identify different wear patterns. The wear patterns can include pitting, spalling, abrasive wear, corrosive wear, thermal stress, machine marks, honing marks, normal wear, and others. The wear pattern could also indicate normal wear.

As used herein, a neural network comprises at least three operational layers. The three layers can include an input layer, a hidden layer, and an output layer. Each layer comprises neurons. The input layer neurons receive the images of the equipment and pass data derived from the pictures to neurons in the hidden layer. Neurons in the hidden layer pass data to neurons in the output layer. The output layer then produces a wear pattern classification. Different types of layers and networks connect neurons in different ways.

At step 530, a second three-dimensional image depicting the surface of the portion of the piece of equipment is received at a second point in time. The three-dimensional image can be generated by a 3D scanner, such as the one described previously with reference to FIG. 2. For example, a time-of-flight scanner or structured light scanner could be used to generate the three-dimensional image. In some aspects, a plurality of images depicting the portion of the piece of equipment are provided.

At step 540, the machine classifier is used to detect the specific wear pattern in the second image. The image does not need to be rendered before processing by the machine classifier. The machine classifier may use the raw depth data and color data as input. In one aspect, preprocessing is performed to identify geometry, such as shapes, surfaces, and edges, in the image. In this case, the geometry can be analyzed by the machine classifier in isolation or with other image data. The machine classifier is trained using labeled images of the specific wear pattern present on different equipment. In one aspect, a neural network can be used to identify different wear patterns. The wear patterns can include pitting, spalling, abrasive wear, corrosive wear, thermal stress, plastic deformation, machine marks, honing marks, and others. The wear pattern could also indicate normal wear.

As used herein, a neural network comprises at least three operational layers. The three layers can include an input layer, a hidden layer, and an output layer. Each layer comprises neurons. The input layer neurons receive the images of the equipment and pass data derived from the pictures to neurons in the hidden layer. Neurons in the hidden layer pass data to neurons in the output layer. The output layer then produces a wear pattern classification. Different types of layers and networks connect neurons in different ways.

At step 550, a first three-dimensional model of the surface is generated. The first three-dimensional model of the surface can describe surfaces and other geometry derived from the first three-dimensional image.

At step 560, a second three-dimensional model of the surface is generated. The second three-dimensional model of the surface can describe surfaces and other geometry derived from the second three-dimensional image.

At step 570, a composite model of the surface is generated by overlaying the second three-dimensional model and the first three-dimensional model. In one aspect, each model is made partially transparent and assigned a different color. Where the dimensions of both models are the same, the composite model could take on a third color. Where the dimensions are different, the individual model surfaces could be viewed. The differences between the two models will then be apparent.

At step 580, the composite model is output for display.

Figure 6:
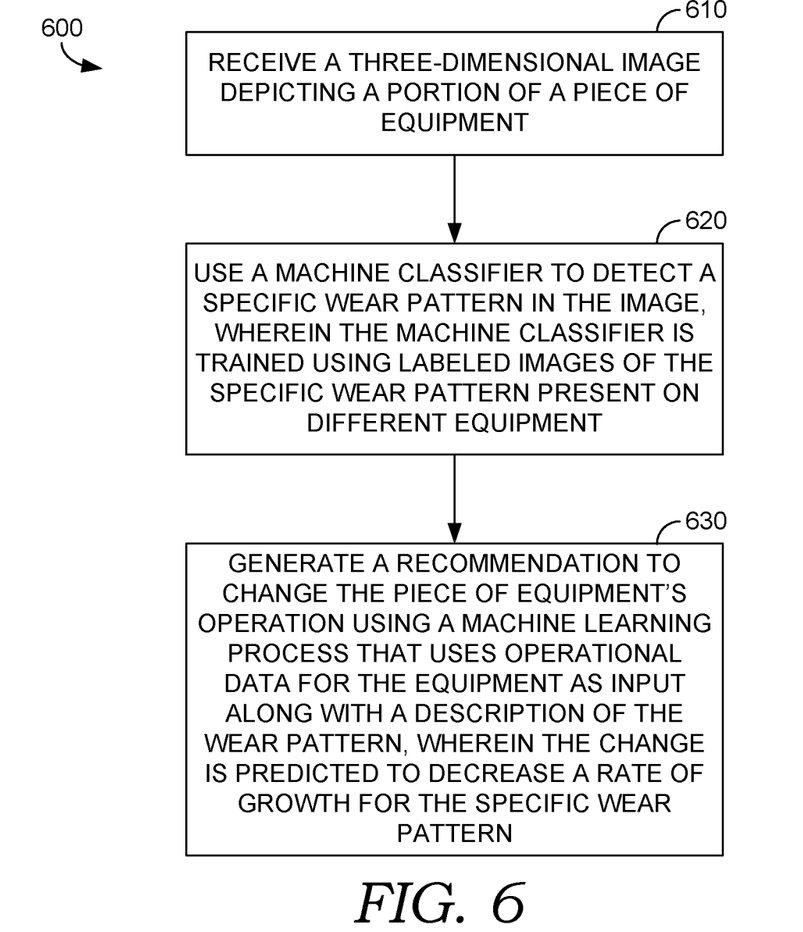
FIG. 6 is a flow chart showing a method of detecting equipment wear, according to an aspect of the technology described herein.

Turning now to FIG. 6, a flow chart showing a method 600 for detecting equipment wear is provided, according to an aspect of the technology described here. Method 600 could be performed by system 300 described previously.

At step 610, a three-dimensional image depicting a portion of a piece of equipment is received. The three-dimensional image can be generated by a 3D scanner, such as the one described previously with reference to FIG. 2. For example, a time-of-flight scanner or structured light scanner could be used to generate the three-dimensional image. In some aspects, a plurality of images depicting the portion of the piece of equipment are provided. As used herein, a three-dimensional image comprises pixels having both color and depth data.

At step 620, a machine classifier is used to detect a specific wear pattern in the image. The image does not need to be rendered before processing by the machine classifier. The machine classifier may use the raw depth data and color data as input. In one aspect, preprocessing is performed to identify geometry, such as shapes, surfaces, and edges, in the image. In this case, the geometry can be analyzed by the machine classifier in isolation or with other image data. The machine classifier is trained using labeled images of the specific wear pattern. The machine classifier is trained using labeled images of the specific wear pattern, as described previously with reference to FIG. 3. In one aspect, a neural network can be used to identify different wear patterns. The wear patterns can include pitting, spalling, abrasive wear, corrosive wear, thermal stress, plastic deformation, machine marks, honing marks, and others. The wear pattern could also indicate normal wear.

As used herein, a neural network comprises at least three operational layers. The three layers can include an input layer, a hidden layer, and an output layer. Each layer comprises neurons. The input layer neurons receive the images of the equipment and pass data derived from the pictures to neurons in the hidden layer. Neurons in the hidden layer pass data to neurons in the output layer. The output layer then produces a wear pattern classification. Different types of layers and networks connect neurons in different ways.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The training implementation described subsequently uses a convolutional neural network, but aspects of the technology are applicable to other types of machine learning.

In each type of deep model, training is used to fit the model output to the training data. In particular, weights associated with each neuron in the model can be updated through training. Originally, the model can comprise random weight values that are adjusted during training. In one aspect, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. The analogous training data comprises labeled analogous images. Each labeled image is input to the model and used to train it. Once a sufficient number of training images are fed to the wear pattern determiner 364, then the training can stop. The wear pattern determiner 364 can then be used to classify unlabeled images.

At step 630, a recommendation to change the piece of equipment's operation is generated using a machine learning process that uses operational data for the equipment as input along with a description of the wear pattern. The change is predicted to decrease a rate of growth for the specific wear pattern. Various wear patterns can be correlated to suggested changes in equipment operation. For example, certain wear patterns may indicate that the lubrication needs to be changed, flow rates within the lubrication system should be increased, and so forth. Aspects of the technology can use the output details about the wear pattern. In addition, the technology can look at all the equipment data to help identify causes of different wear patterns. The change can be to correct an operational problem that seems to cause the wear pattern. In particular, the technology can look for correlations between equipment operation parameters and wear patterns. For example, a correlation could be identified between equipment loads and wear patterns. If this correlation was made, the recommendation could be to change the equipment loads to limit wear. Different types of machine learning can be used to find correlations.

In one aspect, an association rule engine is used to find correlations. Association rule learning is a rule-based machine learning method for discovering interesting relations between variables in large databases. This rule-based approach also generates new rules as it analyzes more data. The ultimate goal, assuming a large enough dataset, is to help a machine mimic the human brain's feature extraction and abstract association capabilities from new uncategorized data.

Exemplary Operating Environment

Figure 7:
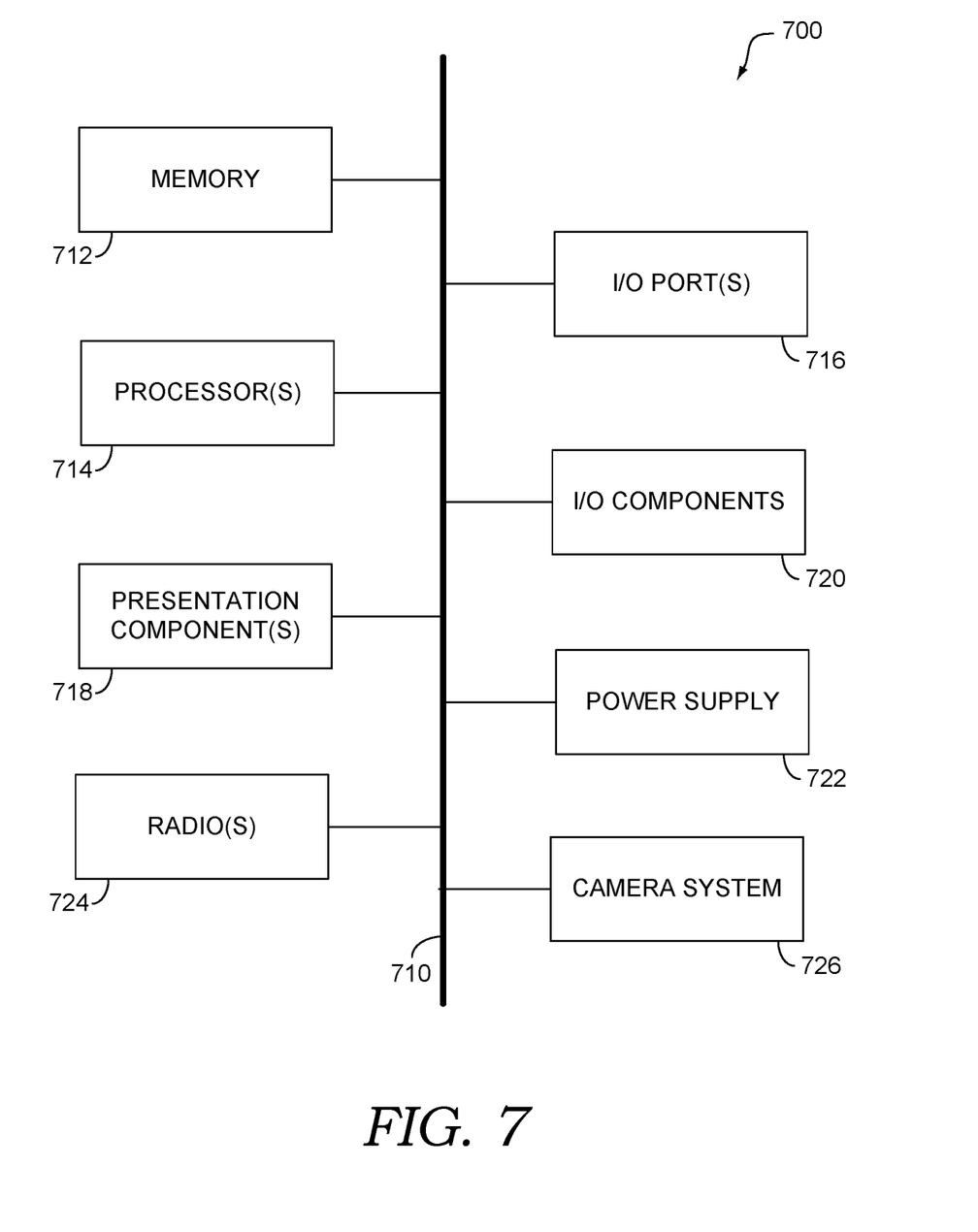
FIG. 7 is a diagram showing a computing system environment suitable for use with aspects of the technology described herein.

Referring to the drawings in general, and initially to FIG. 7 in particular, an exemplary operating environment for implementing aspects of the technology described herein is shown and designated generally as computing device 700. Computing device 700 is but one example of a suitable computing environment and is not intended to suggest any limitation as to the scope of use of the technology described herein. Neither should the computing device 700 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more busses (such as an address bus, data bus, or a combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, vibrating component, etc. I/O ports 718 allow computing device 700 to be logically coupled to other devices, including I/O components 720, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 700. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with camera systems 726. The camera system 726 can include depth cameras, such as stereoscopic camera systems, infrared camera systems, RGB camera systems, structured light camera systems, TOF camera systems, and combinations of these, for generating depth images. The depth images can be used in gesture detection and recognition, displayed to a user, or used to generate augmented reality, virtual reality, or other imagery. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include a radio 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

EMBODIMENTS

Embodiment 1. A method for detecting equipment wear, the method comprising: receiving a three-dimensional image depicting a portion of a piece of equipment; using a machine classifier to detect a specific wear pattern in the image, wherein the machine classifier is trained using labeled images of the specific wear pattern; and generating a recommendation to change the piece of equipment's operation, wherein the change is predicted to decrease a rate of growth for the specific wear pattern.

Embodiment 2. The method of embodiment 1, wherein the recommendation is automatically generated by a machine learning process that takes the wear pattern as input along with monitoring data for the piece of equipment.

Embodiment 3. The method of embodiment 2, wherein the monitoring data comprises an analysis of lubrication used with the equipment.

Embodiment 4. The method of embodiment 2, wherein the machine learning process is an association rule engine.

Embodiment 5. The method as in any one of embodiments 1, 2, 3, and 4, wherein the machine classifier is a convolutional neural network.

Embodiment 6. The method as in any one of embodiments 1, 2, 3, 4, and 5, wherein the wear pattern indicates wear selected from the group consisting of pitting, spalling, abrasive wear, corrosive wear, machine marks, honing marks, and thermal stress.

Embodiment 7. The method as in any one of embodiments 1, 2, 3, 4, 5, and 6, wherein the portion is a gear tooth.

Embodiment 8. A method for detecting an equipment wear trend, the method comprising: receiving, at a first point in time, a first three-dimensional image depicting a surface of a portion of a piece of equipment; using a machine classifier to detect a specific wear pattern in the first image, wherein the machine classifier is trained using labeled images of the specific wear pattern present on different equipment; receiving, at a second point in time, a second three-dimensional image depicting the surface of the portion of the piece of equipment; using the machine classifier to detect the specific wear pattern in the second image, wherein the machine classifier is trained using labeled images of the specific wear pattern present on different equipment; generating a first three-dimensional model of the surface; generating a second three-dimensional model of the surface; generating a composite model of the surface by overlaying the second three-dimensional model and the first three-dimensional model; and outputting for the composite model for display.

Embodiment 9. The method of embodiment 8, further comprising: identifying a first set of characteristics of the specific wear pattern in the first image; identifying a second set of characteristics of the specific wear pattern in the first image; and outputting for display a description of how the first set differs from the second set.

Embodiment 10. The method as in any one of embodiments 8 and 9, further comprising generating a recommendation to change a mechanical characteristic of the piece of equipment's operation, wherein the change is predicted to decrease a rate of growth for the specific wear pattern.

Embodiment 11. The method as in any one of embodiments 8, 9, and 10, wherein the recommendation is automatically generated by a machine learning process that takes the wear pattern as input along with monitoring data for the piece of equipment.

Embodiment 12. The method of embodiment 11, wherein the monitoring data comprises an analysis of lubrication used with the equipment.

Embodiment 13. The method as in any one of embodiments 8, 9, 10, 11, and 12, wherein the wear pattern indicates wear selected from the group consisting of pitting, spalling, abrasive wear, corrosive wear, plastic deformation, machine marks, honing marks, normal wear, and thermal stress.

Embodiment 14. A method for detecting equipment wear, the method comprising: receiving a three-dimensional image depicting a portion of a piece of equipment; using a machine classifier to detect a specific wear pattern in the image, wherein the machine classifier is trained using labeled images of the specific wear pattern; and generating a recommendation to change the piece of equipment's operation using a machine learning process that uses operational data for the equipment as input along with a description of the wear pattern, wherein the change is predicted to decrease a rate of growth for the specific wear pattern.

Embodiment 15. The method of embodiment 14, wherein the operational data comprises an analysis of lubrication used with the equipment.

Embodiment 16. The method as in any one of embodiments 14 and 15, wherein the operational data comprises physical characteristics within a lubrication system used with the equipment.

Embodiment 17. The method as in any one of embodiments 14, 15, and 16, wherein the machine learning process is an association rule engine.

Embodiment 18. The method as in any one of embodiments 14, 15, 16, and 17, wherein the operational data comprises information describing loading on the equipment at different times.

Embodiment 19. The method as in any one of embodiments 14, 15, 16, 17, and 18, wherein the wear pattern indicates wear selected from the group consisting of pitting, spalling, abrasive wear, corrosive wear, normal wear, machine marks, honing marks, and thermal stress.

Embodiment 20. The method as in any one of embodiments 14, 15, 16, 17, 18, and 19, wherein the machine classifier is a convolutional neural network.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for detecting equipment wear, the method comprising:

receiving a three-dimensional image from a three-dimensional scanning rig depicting a surface of a portion of a piece of equipment, wherein the three-dimensional scanning rig comprises at least a left scanner and at least a right scanner, the at least left scanner and the at least right scanner attached to a handle;

using a machine classifier to detect a specific wear pattern in the image, wherein the machine classifier is trained using labeled images of the specific wear pattern; and generating a recommendation to change the piece of equipment's operation, wherein the change is predicted to decrease a rate of growth for the specific wear pattern.

2. The method of claim 1, wherein the recommendation is automatically generated by a machine learning process that takes the wear pattern as input along with monitoring data for the piece of equipment.

3. The method of claim 2, wherein the monitoring data comprises an analysis of lubrication used with the equipment.

4. The method of claim 2, wherein the machine learning process is an association rule engine.

5. The method of claim 1, wherein the machine classifier is a convolutional neural network.

6. The method of claim 1, wherein the wear pattern indicates wear selected from the group consisting of pitting, spalling, abrasive wear, corrosive wear, machine marks, honing marks, and thermal stress.

7. The method of claim 1, wherein the portion is a gear tooth.

\* \* \* \* \*